US006751954B2

(12) United States Patent
Bridger et al.

(10) Patent No.: US 6,751,954 B2
(45) Date of Patent: Jun. 22, 2004

(54) COMPACT HYBRID ACTUATOR

(76) Inventors: Keith Bridger, 113 7th St., NE., Washington, DC (US) 20002-6023; Arthur V. Cooke, 5415 Purlington Way, Baltimore, MD (US) 21212; Frank J. Crowne, 900 Nichols Dr., Laurel, MD (US) 20707; Joseph J. Lutian, 525 Bay Dale Ct., Arnold, MD (US) 21012; John M. Sewell, 13027 Beaver Dam Rd., Cockeysville, MD (US) 21030; George L. Small, III, 97 Segsbury Road, Williamsville, NY (US) 14221

( * ) Notice: Subject to any disclaimer, the term of this patent is extended or adjusted under 35 U.S.C. 154(b) by 50 days.

(21) Appl. No.: 10/287,269

(22) Filed: Nov. 4, 2002

(65) Prior Publication Data

US 2003/0126981 A1 Jul. 10, 2003

Related U.S. Application Data

(60) Provisional application No. 60/337,377, filed on Nov. 5, 2001.

(51) Int. Cl.7 ................................................ F16D 31/02

(52) U.S. Cl. ........................................................ 60/475

(58) Field of Search .................................... 60/475, 473

(56) References Cited

U.S. PATENT DOCUMENTS

| | | | | |
|---|---|---|---|---|
| 2,918,795 A | * | 12/1959 | Marien | 60/475 |
| 4,795,318 A | * | 1/1989 | Cusack | 417/322 |
| 4,927,334 A | * | 5/1990 | Engdahl et al. | 417/322 |

* cited by examiner

*Primary Examiner*—Edward K. Look
*Assistant Examiner*—Michael Leslie
(74) *Attorney, Agent, or Firm*—Phillips Lytle LLP

(57) ABSTRACT

A compact hybrid actuator has a fluid pump (20) arranged to supply fluid to an actuator (44). The pump has at least one electrically-powered solid-state pump driver (21) provided with a displacement element (22). The position of this displacement element modulates the volume of a fluid chamber (23). A driven valve (24) is operatively arranged to control the flows of fluid with respect to the pump chamber, and has one member (29) movable relative to a body (28) to modulate the opening of ports (25, 26) so as to form at least one three-way valve. A valve driver (31) is operatively arranged to operate the driven valve. Electrical power is provided to each valve and to the valve driver so as to operate these various elements in synchronism with one another. The improved pump driver and driven valve may be operated at frequencies in excess of 1 kHz.

15 Claims, 5 Drawing Sheets

COMPACT HYBRID ACTUATOR

CROSS-REFERENCE TO RELATED APPLICATION

This application is a non-provisional application that claims the benefit of the earlier filing date of provisional patent application Serial No. 60/337,377, filed Nov. 5, 2001.

TECHNICAL FIELD

The present invention relates generally to improved compact hybrid actuators, and, more particularly, to an improved fluid pump that has an electrically-powered solid-state driver arranged to modulate the volume of a fluid chamber, and has a driven valve operatively arranged to control the flows of fluid with respect to the pump chamber. The pump driver and driven valve may be operated at frequencies greater than those attainable by oscillatory pumps with passive valves in the prior art.

BACKGROUND ART

The present invention relates to a new type of hybrid actuator that combines some of the most advantageous features of both hydraulic and electric actuators. In particular, it is well established that electrically-powered actuators (commonly referred to as electro-mechanical actuators, or "EMA"s) can be made small, lightweight and powerful, resulting in very high power density. They are also simple to install, service and replace because the power supply to them comprises only electrical cables. However, when an electrically-powered actuator (e.g., a motor-driven ball-screw, etc.) malfunctions or breaks, it will typically jam in the failed position, resulting in catastrophic failure of the system because of consequent loss of control authority.

On the other hand, hydraulic actuators offer the capability of being able to fail gracefully and predictably. For example, if a hydraulic actuator is used to control an aircraft control surface, a failure may result from leakage of hydraulic fluid, and therefore loss of controllable function, but the actuator will not seize in position. Hence, the aircraft may continue to be "flyable" by means of redundant actuators. Instead of locking in any particular position, the control surface can be made to return to a "neutral" position by the aerodynamic forces acting on it. Its return to neutral and subsequent movement may also be passively damped by the action of pistons in cylinders, and hydraulic fluid remaining in the system.

However, hydraulic systems must be supported by an extensive and complex mechanical infrastructure of central pumps, manifolds and tubing. Because of the large number of joints and fittings typically used, these systems are susceptible to corrosion and leakage, and are therefore maintenance intensive. In addition, maintenance and replacement is complicated by the need to bleed the system every time a hydraulic unit, such as an actuator, is removed from the system for service.

The hybrid actuator broadly comprises an electrical power supply, such as the electrical buss of an aircraft or submarine, power-conditioning electronics, an induced-strain material driven pump, and an output ram. The improved actuator employs a novel, compact, very high frequency pump that is collocated with the actuator to eliminate much of such hydraulic infrastructure. The pump is powered electrically, and the only connections to the actuator are electrical leads. Because the actuator mechanism itself is inherently hydraulic (although fed by a very small local pump in lieu of the previous large, complex central hydraulic system), it has the operational advantages of a conventional hydraulic actuator, discussed above. Because the pump is very small and light, the overall actuator (comprising the pump and output ram) has a very high power density.

Actuators that employ electrically-driven local pumps to directly supply pressurized hydraulic fluid to an actuating ram are known in the prior art. One fairly mature class of such actuators are known as Electro-Hydrostatic Actuators ("EHA"s). These actuators generate pressures using small, very high speed, multi-piston pumps driven by brushless DC motors at speeds up to 20,000 RPM. To control the direction and extent of ram motion, the operation of the motor is reversed to pump fluid to one side or the other of the ram. Typical applications include movement of control surfaces on fighter aircraft. While useful for large-scale large-force actuation, EHAs cannot be readily scaled down to applications below about 5 horsepower, primarily because the miniaturized piston pumps approach the limits of achievable tolerances and manufacturability at this size. Consequently, leakage becomes a larger percentage of total flow, and efficiency falls off unacceptably. In addition, the entire EHA system is relatively complex and has a high part-count when the structure of the electric motor, rotating piston pump and associated power conditioning electronics are considered.

There is increasing demand for small electrical actuators in applications requiring distributed structural control, such as morphing aircraft where the airfoil shape is adjusted to adapt to the operating environment and control demands. Similarly, in unmanned aircraft, there is a need for small electrically-powered actuators The present invention provides a simpler, lower part-count alternative to such known EHAs, wherein the pump comprises a solid-state electroactive material, such as a piezoelectric material (e.g., lead zirconate titanate), controlling or modulating the volume of a small compression chamber with high-frequency inlet and discharge valve mechanization. Other active, or induced-strain, so-called "smart" materials could be employed, depending on the particular application. For example, a magnetostrictive material, such as Terfenol-D, can be used advantageously when the system must be operated over a wide temperature range. Military aircraft, for example, must use components that remain functional between about −65° F. and about +265° F. Electrostrictive materials, such as lead magnesium niobate, are more suitable for underwater applications, such as submarine rudder control actuators, where the operating temperature range is constrained over a narrow band.

While such materials provide a unique capability of generating very high force displacement in a lower part-count mechanism, the maximum strains obtainable are typically on the order of 1000 microstrains at best. Moreover, the materials themselves are generally quite dense (e.g., lead- and iron-based formulations), and thus must be operated at high frequency (e.g., on the order of 1 kHz–10 kHz) to achieve high power density. In a practical pump, the resulting pulsating flow must be rectified by inlet and discharge check valves. However, higher frequencies in this range are well beyond the capabilities of existing, conventional, passive check valves, which are typically limited to around 50–150 Hz, even with higher performance valves. Accordingly, to implement the invention, entirely novel passive designs must be employed, or the valves must be driven actively at very high frequencies to match the compression cycles in the pump chamber.

Others have proposed to use such induced-strain solid-state "smart" materials to operate an electrically-driven pump. For example, U.S. Pat. No. 4,927,334 ("Engdahl") discloses various constructions of magnetostrictive rods displacing pistons to produce a pumping device. However, Engdahl generically indicates the necessary check valves by conventional symbols, and does not address their specific construction.

International Patent Application No. PCT/US97/15608 (Publication Number WO 98/11357), assigned to Etrema Products, Inc., discloses a magnetostrictively-driven pumping element in combination with magnetostrictively-driven inlet and exhaust poppet valves, a magnetostrictively-driven four-way directional control valve, and a piston/cylinder actuator. While this device recognizes the need for valve elements that can operate at the same frequency as the pump element, it does not adequately address the problem of providing reasonable valve openings using microstrain actuating elements, other than to suggest that mechanical motion amplifiers might be provided.

A disclosure of the University of South Carolina Office of Technology Transfer, OTT ID No. 97152 by Victor Giurgiutiu, shows a solid-state induced-strain pump with inlet and outlet "valving" elements, termed "fluid diodes", that depend on the difference in dynamic flow impedance due to flow direction through a diffusing nozzle. Such elements have adequate frequency response, but leakage limitations.

Before the dominance of semiconductor electronic components, a large number of "fluidic" devices were proposed and developed as elements for use in logic circuits for computation purposes. One such device was invented and patented in 1925 by Dieter Thoma and is referred to as the "Thoma counterflow brake". It acts as a unidirectional element (i.e., a diode) for DC flow control by porting fluid into a vortex chamber either through the central hole of the vortex (i.e., the easy direction), or through an entry pipe tangential to the vortex (i.e., the direction of high resistance). Because the actual experimental diodicity of the simple vortex diode is rather low, its usefulness as a controller of mass flow is rather limited, especially when system considerations prohibit any backflow.

In 1969, C. A. Kwok invented a two-terminal device consisting of two triodes (i.e., a vortex diode with a second side port and grounded center hole) in series, which he called a "double vortex diode". This device has large diodicities (i.e., flow forward relative to backward) and can, in principle, act as an effective unidirectional two-terminal element. However, because Kwok's device functions primarily by dumping fluid out of its grounded center ports in the difficult direction, it is not useful as a mass driver.

Thus, these various references, either individually or collectively, teach the use of such electrically-controlled induced-strain pumps, together with actively-controlled two-way valves, to generate hydraulic power proximate the site of its usage, such as near a flight control surface. However, upon information and belief, while the broad concept may be old, these references do not teach certain improvements to the basic system that are disclosed and claimed herein.

DISCLOSURE OF THE INVENTION

The present invention provides an improved electrically-powered solid-state induced-strain driven pump in combination with either of two alternative valving mechanisms to deliver controlled flow or controlled pressure to a piston/cylinder actuator.

Two different valving mechanisms can be used to enable the rapid inlet and discharge flow cycles to and from the compression chamber. An active mechanism is described which uses a motor-driven rotating valve member with fluid paths to alternately align discharge and inlet ports with corresponding openings in a housing, in synchronism with the expansion and contraction of the pump chamber, respectively, so as to form one or more three-way valves for directing the pump flow. A passive mechanism is also described which exploits a particular structure with asymmetric forward and reverse fluid paths to produce a highly effective unidirectional "fluid diode" check-valve equivalent at each of the two chamber ports.

In order to rectify the high-frequency low-displacement motion of the solid-state piston pump to produce flows to a low-frequency high-displacement actuator, an effective, high-speed valve is required. During the compression phase of the pump piston's travel, this valve must open the compression chamber to the pump's pressure port. The pressurized fluid is then discharged to supply flow to an accumulator or actuator cylinder. As the piston reaches the point of furthest extension and reverses direction, the valve must close the passage to the pressure port and open the compression chamber to the return port. Hydraulic fluid is then drawn or ingested through the return port to refill the compression chamber, and the cycle repeats. In this way, a net positive flow from pressure to return is obtained from the oscillatory motion of the pump piston.

In a typical single-acting pump, this valving is provided by passive spring-loaded flow-operated check valves. As pointed out earlier, such valves cannot operate effectively at the frequencies required for an effective solid-state pump driver.

A similar problem would seem to exist in high-speed rotary piston pumps, such as used in a typical EHA, since the individual swashplate-driven pistons are oscillated at frequencies of the same order. However, such pumps use rotating valves driven by the same shaft as the swashplate and mechanically phased to the piston motion to provide the required pressure and return connections. The present invention effectively removes the swashplate piston drive of an EHA rotary pump, and replaces it with a solid-state piston drive, but retains the motor-driven rotating valve. By utilizing the proven rotary valve mechanization, high speed actuation of individual valves is achieved.

The valve-driving motor, of course, can be much smaller than a pump-driving motor, but the necessary electronic speed control driver is essentially the same in function, although only required to maintain a speed consistent with the pump driver frequency. The valve is no longer mechanically synchronized with the piston motion. Rather, the usual DC brushless motor position feedback signal can be used to provide phase synchronization of the pump current driver.

This feature can also be used to advantage in one form of the invention (e.g., the second embodiment, shown in FIG. 2) in which the solid-state driven pump is connected through the driven rotary valve directly to an actuator cylinder, instead of being used to charge a high-pressure accumulator to supply pressure to an electrohydraulic servovalve that controls flow to an actuator (e.g., as in the first embodiment, shown in FIG. 1). In this second embodiment, position feedback from the actuator piston is compared with a position command to generate a closed-loop error signal. Pump output flow is made proportional to this error signal by modulating the amplitude of the constant frequency current pulses applied to the solid-state pump driver. When the error signal passes through zero and increases with changed polarity, the current pulse amplitude is increased proportionately, but with its phase shifted by 180° with respect to the rotating valve position reference, much as a modulated AC carrier signal would be.

In this case, the rotary driven valve consists of a three-way valving section which connects the pump compression chamber alternately to the extend or retract sides of the actuator cylinder. When the pump drive current pulses are in phase with the valve position, flow out of the pump is connected to the extending side of the actuator, and flow back into the pump is connected from the retracting side of the cylinder, so that the actuator piston rod extends. When the pump drive current pulses are shifted by 180°, the converse is true, with flow out of the pump being connected to the retract side of the actuator so that the piston rod retracts.

With parenthetical reference to the corresponding parts, portions or surfaces of the first disclosed embodiment, merely for purposes of illustration and not by way of limitation, the present invention provides, in one aspect, an improved fluid pump for use in a compact hybrid actuator (20).

This improved fluid pump broadly comprises: at least one electrically-powered solid-state pump driver (21) having a displacement element (22); a variable-volume fluid chamber (23), the volume of which is modulated by the position of the displacement element relative to the body; a first power controller (49) operatively arranged to selectively supply an alternating current to the pump driver; a driven valve (24) operatively arranged to control the flows of fluid with respect to the pump chamber, the driven valve having a body (28) provided with a plurality of ports (25, 26) and having a member (29) movable relative to the body to modulate the opening of the ports so as to form at least one three-way valve; a valve driver (31) operatively arranged to move the member relative to the body; and a second power controller (50) electrically coupled to the first power controller and operatively arranged to control the phase of the pump driver in synchronism with the phase of the valve driver; whereby the driven valve will allow fluid to be discharged from the chamber to the outlet port when the pump chamber contracts, and will permit fluid to be drawn into the pump chamber through the inlet port when the pump chamber expands.

As used herein, the expression "electrically-powered solid-state pump driver" refers to a pump driver that includes an electrically-powered induced-strain "smart" material, such as a magnetostrictive material, an electrostrictive material, a piezoelectric material, or the like.

In the preferred embodiment, the driven valve has a moving member that is arranged to be rotated relative to the body. The valve driver may be a motor (e.g., an electric motor, a hydraulic motor, or the like) having a rotatable output shaft that is coupled to the moving member.

The current supplied to the pump driver may be an alternating current (e.g., a sinusoidal waveform, etc.), or may be in the form of a series of current pulses. These may be rectified pulses, with phase being used to control the direction and amplitude being used to determine the magnitude of such flow.

The invention may further comprise a hydraulic actuator (e.g., such as a conventional fluid-powered piston-and-cylinder arrangement, etc.) that is operatively arranged to communicate with the driven valve. If desired, one or more accumulators may be operatively arranged between the driven valve and the actuator. A flow-control valve (e.g., an electrohydraulic servovalve, etc.) may be operatively arranged between the driven valve and the actuator for controlling the flow of fluid with respect to the actuator. In another form, the output of the driven valve may be provided directly to the hydraulic actuator.

The first controller may be operatively arranged to supply current to the pump driver in phase with respect to the position of the rotatable member in the valve driver to supply such current 180° out of phase with respect to the phase of the valve driver position to move the hydraulic actuator in the opposite direction.

In yet another form, the pump may comprise two of such pump drivers, with these pump drivers being operatively arranged so that the motions of the respective pistons oppose one another. This configuration has an additional advantage that the Newtonian forces attributable to the acceleration of the respective elements in these pump drivers may oppose and cancel one another, thereby reducing the overall vibration of the system.

In another aspect, the invention provides an improved fluid pump which broadly comprises: an electrically-powered solid-state pump driver having a displacement element; a variable-volume fluid chamber, the volume of which is modulated by the position of the displacement element; a first controller operatively arranged to selectively supply an alternating current to the pump driver; and two passive double-vortex valves (130), each having an inlet port and an outlet port, these valves being arranged to control the fluid with respect to the chamber such that one double-vortex valve will allow fluid to be discharged from the chamber to the outlet port when the chamber contracts and the other double-vortex valve will permit fluid to be drawn into the chamber through the inlet port when the chamber expands.

Here again, many of the details previously discussed may be applied to this form of the improved fluid pump. The vortex valve may be arranged to have a greater impedance to flow in one direction than in the other direction.

Accordingly, the general object of the invention is to provide an improved compact hybrid actuator.

Another object is to provide an improved compact hybrid actuator that is particularly adapted for use in "power-by-wire" aircraft applications where it is desired to generate hydraulic power locally in the vicinity of its application and usage.

Another object is to provide an improved fluid pump having an electrically-powered solid-state pump driver provided with a displacement element, a variable-volume fluid chamber, the volume of which is modulated by the position of the element relative to the surrounding body, and a driven valve operatively arranged to actively control the flow of fluid with respect to the chamber.

Still another object is to provide an improved fluid pump that employs an oscillatory pump driver and valve that may be operated at frequencies in excess of 1 kHz.

These and other objects and advantages will become apparent from the foregoing and ongoing written specification, the drawings, and the appended claims.

DESCRIPTION OF THE PREFERRED EMBODIMENTS

Figure 1:
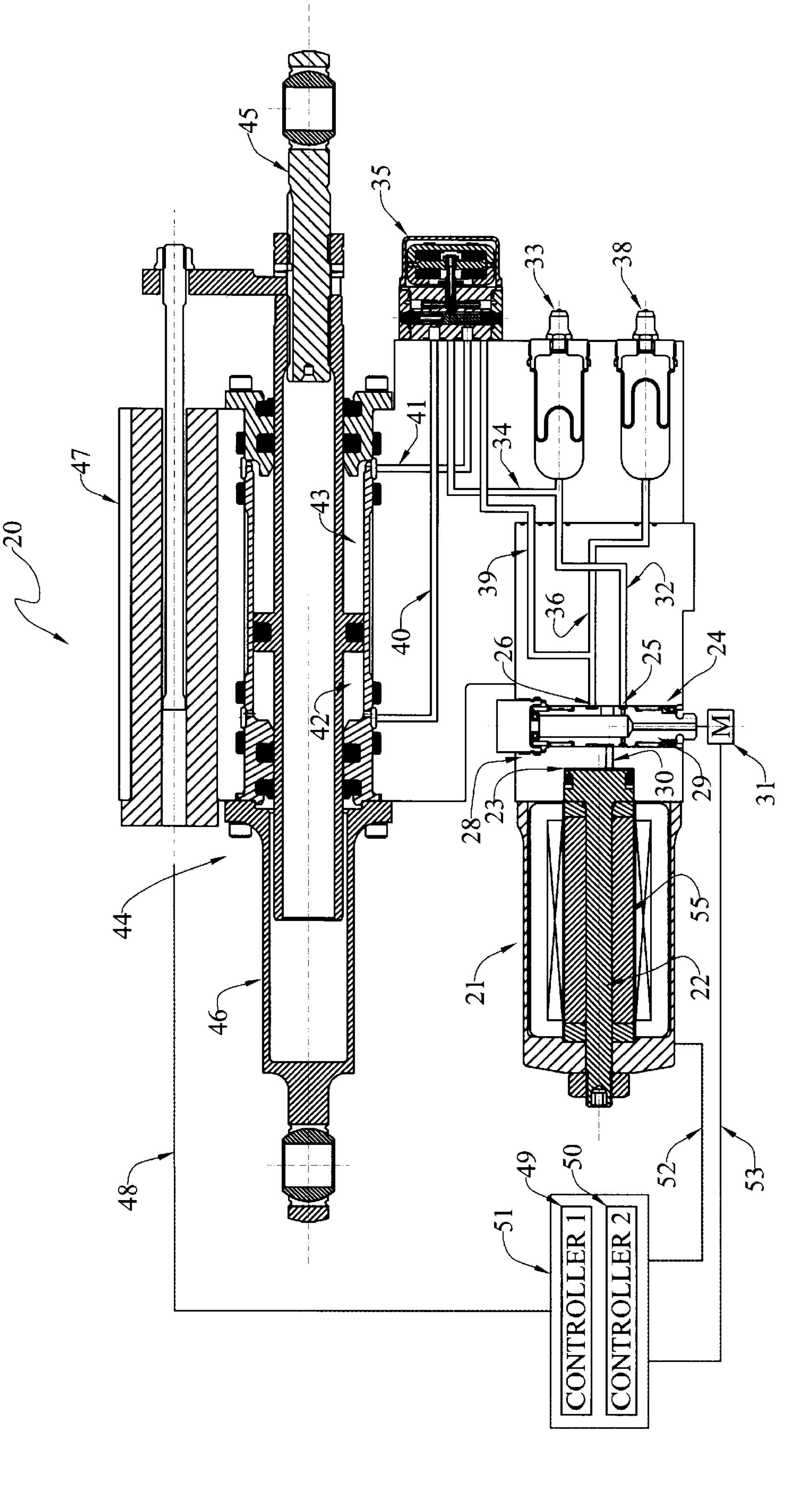
FIG. 1 is a schematic view of a first form of an improved compact hybrid actuator, this view showing the oscillatory pump driver, the variable-volume fluid chamber, the driven valve, the valve driver, the first and second power controllers, the accumulators, the directional control valve and the fluid-powered actuator.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure normally faces the reader. Similarly, the terms "inwardly" and "outwardly" generally refer to the orientation of a surface relative to its axis of elongation, or axis of rotation, as appropriate.

First Embodiment (FIG. 1)

FIG. 1 shows a first form of the improved compact hybrid actuator, generally indicated at 20. Actuator 20 is shown as broadly including an electrically-powered solid-state pump driver 21 having a displacement element 22, and a variable-volume fluid chamber 23. The volume of chamber 23 is modulated by the position of displacement element 22 relative to the body surrounding the chamber.

A driven valve, generally indicated at 24, has an inlet port 25 and an outlet port 26, and is operatively arranged to control the flows of fluid with respect to the chamber. More particularly, this driven valve has a body 28 provided with a plurality of ports, and has a member 29 rotatable within the body to modulate the opening and closing of these ports. Thus, valve 24 is a three-way valve, with one port 30 communicating with the pump chamber, and with inlet and outlet ports 25, 26. As used herein, the term "three-way valve" refers to the number of different-pressure fluid ports communicating with the valve. For example, if a valve has an inlet port, an outlet port and one control port, it would be a "three-way valve". Alternatively, if the valve has an inlet port, an outlet port, and two separate control ports, it would be a "four-way valve", and so on.

Driven valve 24 is arranged to be selectively operated by means of a motor 31. This motor may be an electric motor, a hydraulic motor, or some other type of motor.

The hydraulic output from port 25 is provided via line 32 to a high-pressure fluid accumulator 33, and via conduit 34 to one port of a four-way flow control valve 35, such as an electrohydraulic servovalve. The hydraulic input to driven valve port 26 is provided via line 36 from low-pressure accumulator 38, and via conduit 39 to the return port of valve 35. Valve 35 is arranged to provide controlled pressures via lines 40, 41 to the opposed chambers 42, 43, respectively, of a fluid-powered actuator, generally indicated at 44. The position of the extensible rod 45 relative to cylinder 46 is sensed and determined by a linear variable differential transformer ("LVDT") 47, and such position signal is supplied via conductor 48 to first controller 49, which is operatively arranged to supply alternating current to the pump driver via line 52. Controller 49 may also receive feedback from a pressure sensor (not shown), indicating the pressure in the high-pressure accumulator 33, and may provide control current via a connection (not shown) to servovalve 35.

A second controller 50 operates the valve driver 31 to maintain constant valve switching frequency at the pump driver frequency, and to provide valve position feedback to controller 49 so as to synchronize the phase of the pump driving current with the valve position.

Thus, in this first embodiment, the oscillatory pump driver is used to control the flow of fluid from pump chamber 23. Driven valve 24 is in the form of a three-way valve, and used to direct the flow of fluid from the pump chamber to a high-pressure accumulator 33 and provide return flow from a low-pressure accumulator 38. High pressure flow is controlled by servovalve 35, and is ultimately supplied to the opposed fluid chambers of fluid-powered actuator 44.

As previously noted, the driver has a stacked rod 55 of an electrically-powered induced-strain material, such as a magnetostrictive, electrostrictive or piezoelectric material. Thus, by providing alternating current to the driver, displacement element 22 may be caused to oscillate relative to the body, to alternately expand and contract the pump chamber. Driven valve 24 is arranged to actively control the flows of fluid with respect to the pump chamber in synchronism with the operation of the pump-driver. One unique advantage of the improved pump is that it may be operated at frequencies in excess of 1 kHz.

Figure 2:
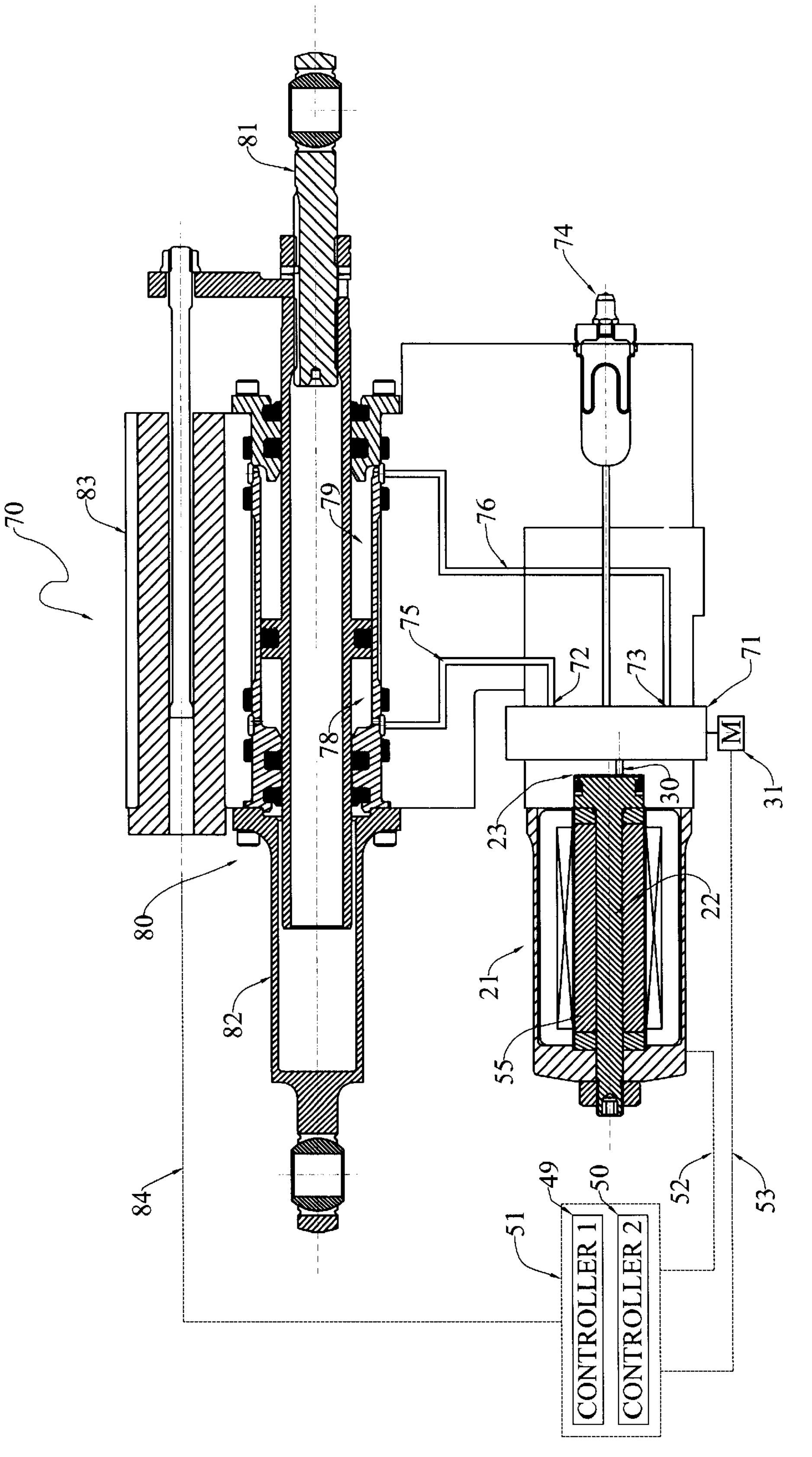
FIG. 2 is a schematic view of a second form of the improved compact hybrid actuator, this view showing the output of the driven valve as being supplied directly to the opposed chambers of the hydraulic actuator.

Second Embodiment (FIG. 2)

A second form of the improved compact hybrid actuator is generally indicated at 70 in FIG. 2. This form is shown as including an electrically-powered solid-state pump driver, again indicated at 21, having a displacement element 22, and a variable-volume fluid chamber 23. As with the first embodiment, the volume of chamber 23 is arranged to be modulated by the position of the displacement element relative to the body surrounding the chamber.

A driven valve, schematically indicated at 71, is operatively arranged to control the flows of fluid in to and out of the pump compression chamber 23 via conduit 30 and ports 72 and 73, connecting the hydraulic outputs of the driven valve via conduits 75, 76, to the opposed chambers 78, 79, respectively, of a fluid-powered actuator, generally indicated at 80. An accumulator 74 may be operatively associated with the driven valve through a conventional check valve (not shown) to accommodate possible system leakage with make-up fluid. As with the first embodiment, the driven valve has a valve driver, again indicated at 31, that is operatively arranged to rotate one member relative to a body to modulate the opening and closing of a series of ports so as to form, in this case, the equivalent of two three-way valves.

Actuator 80 has a rod 81 that is mounted for movement relative to a body 82. The position of this rod relative to the body is sensed by LVDT 82, which supplies a feedback signal via line 84 to controller 49, which is operatively arranged to supply alternating current to the pump driver via line 52. A second controller 50, electrically coupled to controller 49 (as indicated by box 51) operates the valve driver 31 to maintain constant valve switching frequency at the pump driver frequency, and to provide valve position feedback to controller 49 so as to synchronize the phase of the pump driving current with the valve position.

Thus, the salient difference between the first and second embodiments is that, in the second embodiment, the flow-control valve has been omitted, and the output of rotary valve 71 is provided directly to the opposed chambers of the actuator. The direction of movement of actuator rod 81 may be controlled as a function of the phase of the current supplied to the pump driver 21, as compared to the phase of the valve position.

Figure 5:
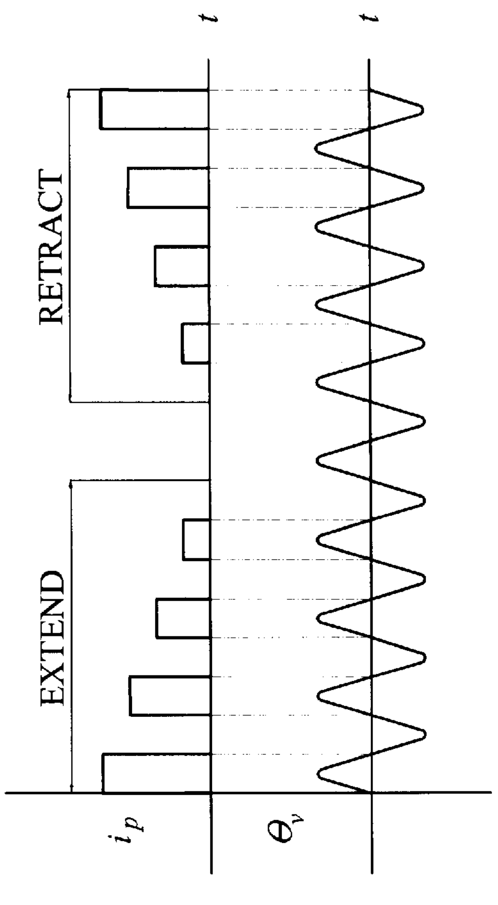
FIG. 5 is a plot showing a series of current pulses supplied to the pump, as a function of time, and illustrating the comparable valve position of the driven valve as a function of time.

This is graphically illustrated in FIG. 5, where a plurality of sequential pulses of electrical current $i_p$ are shown as being provided to the pump driver 21. The magnitude of these pulses is shown as decreasing over time to zero while the actuator rod 45 is extended, and as being phase-shifted by 180° and increasing in magnitude as the actuator rod is retracted relative to its body. The position of the movable member of the driven valve $\theta_v$ is shown as being a sinusoidal waveform for phase comparison purposes.

Figure 3:
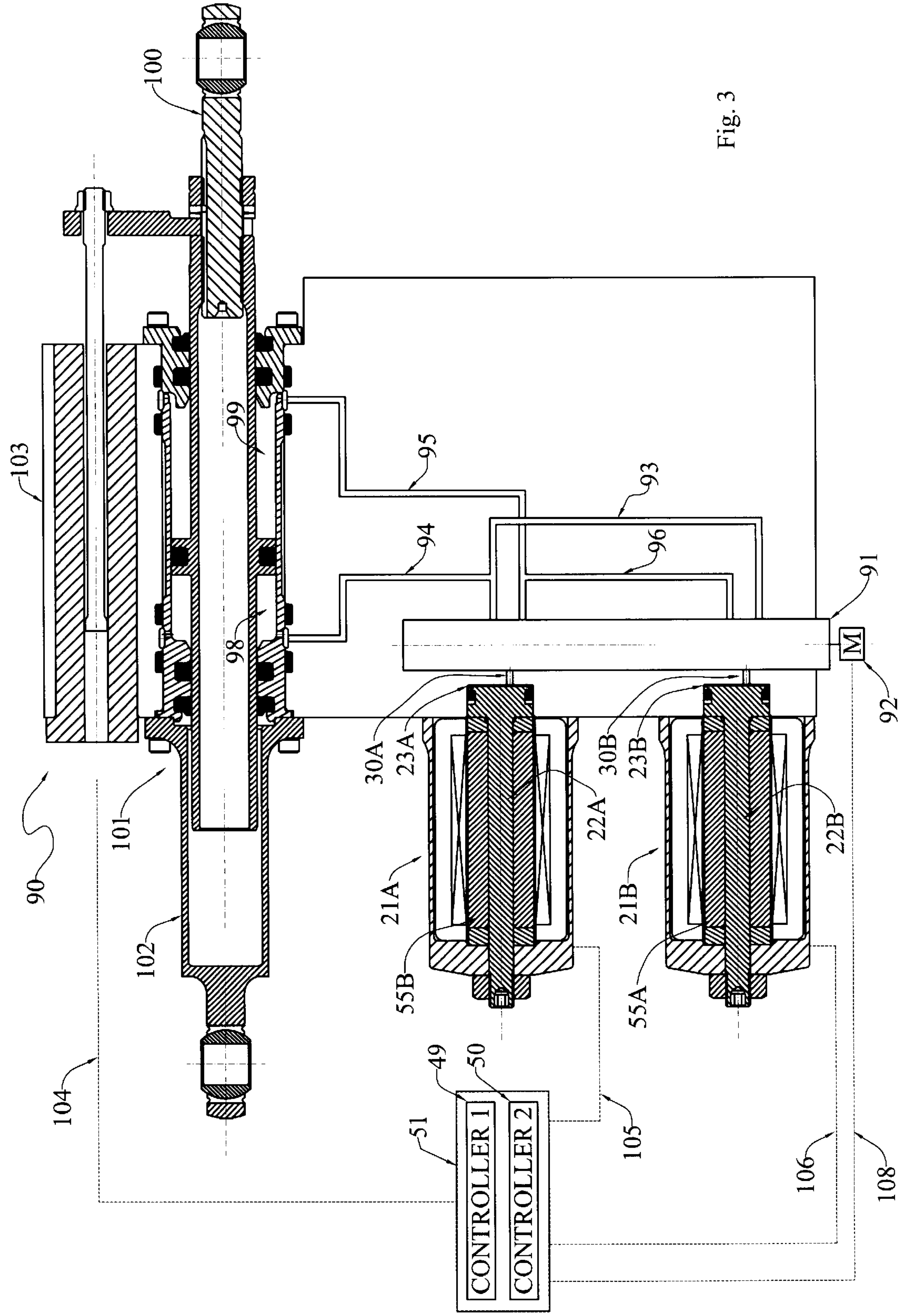
FIG. 3 is a schematic view of a third form of the improved compact hybrid actuator, this view showing the use of two separate oscillatory pumps in association with a single driven valve, and with the hydraulic outputs of the driven valve being supplied directly to the hydraulic actuator.

Third Embodiment (FIG. 3)

FIG. 3 illustrates a third form of the improved actuator, generally indicated at 90.

In this form, two pump drivers are associated with a single driven valve. The uppermost pump driver is indicated at 21A, and the lowermost pump driver is indicated at 21B. Each of these pump drivers has a displacement element 22A, 22B arranged to modulate the volume of variable-volume fluid chambers, 23A, 23B, respectively. These two pump chambers communicate with driven valve 91 via conduits 30A, 30B. Driven valve 91 is arranged to be rotated by a motor 92.

Pump drivers 21A and 21B are adapted to be operated in an alternative sense. In other words, as one of the pump chambers expands, the other contracts, and vice versa. Thus, these two pump drivers are normally operated 180° out of phase with respect to one another. The outputs or inputs, as appropriate, of their respective pump chambers are controlled by driven valve 91. For example, when pump chamber 23B contracts, valve 91 is operated so that the flow of fluid is provided via conduits 93 and 94 to left actuator chamber 98, while the return flow of fluid from right actuator chamber 99 is provided via conduit 95 to contracting pump chamber 23A. Conversely, when pump chamber 23A contracts in volume, the flow of fluid provided thereby is provided via conduit 94 to left chamber 98, and the return flow from right chamber 99 is provided via conduits 95 and 96 to expanding pump chamber 23B. Valve 91 thus provides the function of two three-way valves in this case.

Here again, an LVDT 103 senses the position of the actuator rod 100 relative to the body 102, and supplies a feedback signal via line 104 to controller 49, which is operatively arranged to supply out-of-phase alternating currents to the pump drivers via lines 105 and 106. A second controller 50, coupled to controller 49 (as indicated by box 51), operates the valve driver 31 to maintain constant valve switching frequency at the pump driver frequency, and to provide valve position feedback to controller 49 so as to synchronize the phase of the pump driving current with the valve position. As in the second embodiment, the direction of movement of actuator rod 81 may be controlled as a function of the phase of the currents supplied to the pump drivers 21A and 21B as compared to the phase of the valve position.

Thus, the salient feature of this third embodiment is that the two pump drivers are operated 180° out of phase with respect to one another such that as one pump chamber is contracting, the other is expanding, so as to provide an uninterrupted sequence of flow pulses in and out of the actuator cylinder.

Figure 4:
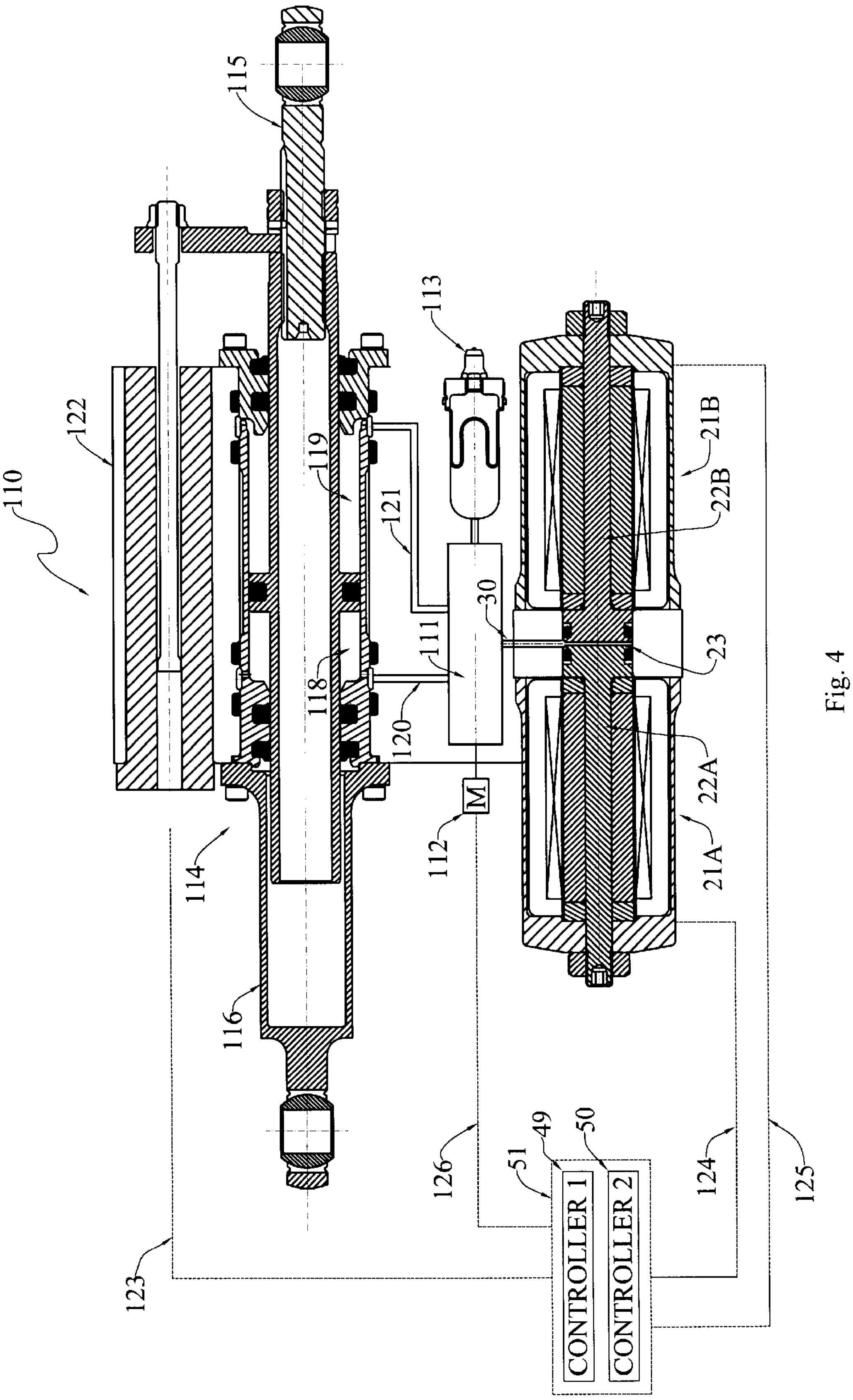
FIG. 4 is a schematic view of a fourth form of the improved compact hybrid actuator, this view showing the use of two opposed oscillatory pump drivers that are ideally operated in phase with one another such that the vibration attributable to the movement of their respect displacement elements will substantially oppose and cancel one another, this view also showing the output of the pump chamber as being provided to a driven valve, and then directly to the opposed chambers of the hydraulic actuator.

Fourth Embodiment (FIG. 4)

FIG. 4 illustrates a fourth embodiment of the improved compact hybrid actuator, generally indicated at 110.

This form has two pump drivers, again indicated at 21A and 21B, respectively. However, in this form, the two pump drivers are arranged so as to oppose one another, and to have a single common pump chamber 23. These two pump drivers are normally operated in phase with one another such that their respective displacement elements 22A, 22B, move toward and away from one another. The fluid in pump chamber 23 is provided via conduit 30 to a driven valve 111, controlled by a motor 112. If desired, an accumulator 113 may be associated with driven valve 111.

This form also has a double-acting fluid-powered actuator, generally indicated at 114. Actuator 114 has a rod 115 mounted for movement relative to a body 116. The driven valve is arranged to control the flow of fluid with respect to opposed actuator chambers 118, 119 via conductors 120, 121, respectively. An LVDT 122 is operatively arranged to sense the position of the actuator rod 115 relative to its body 116, and to provide a feedback signal via conductor 123 to controller 49, which is operatively arranged to supply alternating currents to both pump drivers 21A and 21B via lines 124 and 125. A second controller 50, electrically coupled to controller 49 (as indicated by box 51), operates the valve driver 31 to maintain constant valve switching frequency at the pump driver frequency, and to provide valve position feedback to controller 49 so as to synchronize the phase of the pump driving currents with the valve position. The direction and magnitude of movement of actuator rod 115 may be controlled as a function of the phase and amplitude, respectively, of the current supplied to the pump drivers, relative to the phase of the valve position.

As indicated above, the first and second pump drivers 21A, 21B are normally operated in phase with one another so that their opposed accelerations tend to cancel one another. This has the advantage of reducing the overall vibration attributable to the system. While not shown as being to scale, the individual pump drivers of this fourth embodiment may be of reduced size, as compared with the pump drivers of the other forms, since they are being operated such that the fluid displacements of each are additive.

Figure 6:
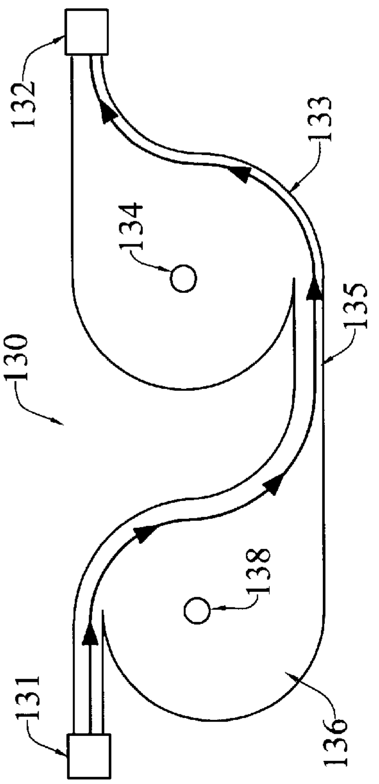
FIG. 6 is a schematic view of the improved double-vortex valve, showing the ease of flow in one direction.

Fifth Embodiment (FIG. 6)

As described in the previous embodiments, fluid flow into and out of the variable-volume pump chamber may be controlled using an actively-driven three-way valve to parse flow from a chamber port to a high-pressure output port or to a low-pressure return port. An alternative means of controlling flow into and out of the fluid chamber is to use two two-port configuration devices, connected between the fluid compression chamber and a high-pressure output port and a low-pressure return port, respectively.

A preferred embodiment of such two-way valves exploits a passive device that promotes flow in one direction, and hinders it in the reverse direction (referred to in this context as "diodicity"), by virtue of both its fluid dynamics and its geometry. In practice, on a pump, one such device would be employed at the output port of the variable-volume fluid chamber to conduct high-pressure fluid to an accumulator or to the driven side of an actuator ram, during the pressure cycle of the piston stroke. A similar device on the return port of the fluid chamber, but oriented in the opposite direction, would then allow flow back into the chamber from a reservoir (or from the opposite side of an actuator ram) during the other half of the pumping cycle. In the present invention, such a passive device that provides for high flow in one direction and low flow in the reverse direction, may be used in lieu of the actively-controlled valves of the previously-described embodiments.

Figure 7:
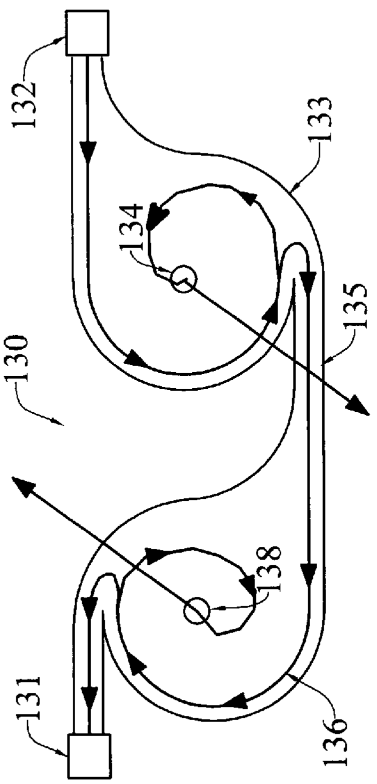
FIG. 7 is a schematic view similar to FIG. 6, but showing the impediment to flow in the opposite direction.

The double-vortex device used to provide substantially unidirectional flow is illustrated, in principle, in FIG. 6, and is generally indicated at 130. In the pressure stage of the pump cycle, fluid moves relatively unimpeded from the compression chamber of the pump 131 to the high pressure reservoir 132 by smoothly following the indicated contour of the internal cavity of the double-vortex, as shown in FIG. 6. However, in the reverse direction, as shown in FIG. 7, when the pressure in the fluid chamber decreases, fluid tries to follow the pressure gradient and go back from 132 to 131. However, it follows the indicated tortuous path that impedes its ability to flow in such reverse direction. In the first vortex chamber 133 of the double-vortex that the fluid encounters in this direction, the returning fluid is constrained to spin around the outer wall and toward the center of the chamber in vortex-like fashion. A specially-configured central port 134, discussed in greater detail below, allows fluid to accumulate during this half of the cycle. Accordingly, very little of the return flow can make it past vortex chamber 133 into communication channel 135. Any fluid that does make it into communication channel 135 then faces the same situation in vortex chamber 136 that was seen upon entering vortex chamber 133. In other words, the fluid tends to accumulate in central port 138, rather than make its way back into the compression chamber 131.

The central ports are fitted with hollow fluid-filled tubes perpendicular to the upper and lower surfaces of the vortex chambers. The fluid in the tubes is in free communication with the fluid in the vortex chambers. The lengths of the tubes are such that they act as quarter-wave transmission lines at the frequency of the pump. This makes them appear as AC grounds at the pump frequency (i.e., as "dumps" for the two diodes). For DC flows, however, the diodes do not allow flow out the center hole, and no fluid is lost. The pressure at the plane of intersection between the hollow tube and the vortex chamber is precisely controlled by the length of the tube and the frequency of operation of the pump. Thus, during the part of the pumping cycle when it is desirable to form a vortex (i.e., during reverse flow against the favored direction of the device), the pressure is made effectively zero at the plane of intersection, thereby encouraging fluid spin and outflow through the central port. When the pump moves to the next part of the cycle and forward flow is desired, the pressure at the plane of intersection becomes very high. This forces out fluid stored during the previous portion of the pump cycle from the resonator tube into the vortex chamber to enhance forward flow. The high pressure also makes the central port appear to the fluid to be blocked, thus discouraging vortex action and favoring the smooth sliding of fluid along the vortex chamber walls in the forward direction. The oscillating pressure extremes at the plane of intersection are developed automatically by the hollow tube behaving as a quarter wave resonator, where the wavelength (hence length of cylinder) is dictated by the frequency of operation of the pump.

From the foregoing discussion, it is clear that the diodicity of the device (i.e., the relative resistance of the return flow vs. the relative ease of the forward flow) increases as a second vortex chamber is added. Accordingly, the ratio of forward-to-back flow can be further increased by simply ganging together more vortex chambers in series with one another.

A second identical double-vortex device is connected to the low-pressure return port of the compression chamber, but is oriented in the opposite direction, such that return flow from the supply reservoir into the compression chamber is facilitated, whereas outflow from the compression chamber into the supply is substantially blocked during the subsequent part of the pump cycle.

The double-vortex structure has excellent response at high frequencies because the vortex, once set up in the chamber, can remain intact and "idle" during the phase of the flow where fluid enters the center port, and then interact strongly with the flow entering the side port during the subsequent phase. In other words, the vortex is constantly spinning in one direction, and is effective in properly influencing both the forward and reverse flows without changing its own rotation direction. This should be contrasted with other passive valve mechanisms which rely on differential flows through orifices. In common with the present double-vortex mechanism, these devices feature very different flow paths and flow resistance in the forward and reverse directions, leading to the desired diodicity. However, in the prior art passive valves, each time the flow direction is changed, the flow pattern and flow dynamics must be "disassembled" before replacing with another for the next half cycle. This results in dissipation and time lag.

The fifth form of the improved hybrid actuator is produced by substituting two double-vortex fluid diodes, as described above, for the valve 24 shown in FIG. 1. These are arranged so that pressurized fluid from the pump chamber 23 may flow from conduit 30 to line 25 and thence to the high-pressure accumulator 33, and return fluid may flow from line 26 back to conduit 30. Thus, the actively-driven valve 24 and its associated motor 31 and controller 50 may be replaced by such passive double-vortex elements. However, since there can be no relative phase control of the pump driver and the passive valving elements, the accumulators 33 and 38 and the servovalve 35 must be retained. As such, passive double-vortex valves do not lend themselves to the second and third embodiments, but they could be used in the fourth form.

Modifications

The present invention contemplates that many changes and modifications may be made. As indicated above, the invention should contain at least one electrically-powered solid-state pump driver having a displacement element. Two or more of such drivers may be used. The various drivers may use electrostrictive, piezoelectric or magnetostrictive elements. One particularly-preferred material is Terfenol-D, but this should not be regarded as limitative of the scope of the appended claims.

In the foregoing forms, the pump driver has a displacement element, the position of which is used to modulate the volume of a fluid chamber. In each case, a driven valve is operatively arranged to control the oscillatory flow of fluid with respect to the pump chamber. The hydraulic output of the driven valve may be provided to accumulators, and then to a flow-control valve, or, alternatively, may be provided directly to the opposed chambers of the fluid-powered actuator. The driven valve should have an inlet port and outlet port, and should also have one member movable relative to the body to modulate the opening of these ports so as to form at least one three-way valve. In one form, the valve member may be mounted for simple rotational movement relative to a body. The valve driver may be a motor, such as an electrical motor, hydraulic motor, a pneumatic motor, or the like.

Therefore, while several forms of the improved compact hybrid actuator, and the fluid pumps associated therewith, have been shown and described, and several modifications thereof discussed, persons skilled in this art will readily appreciate that various additional changes and modifications may be made without departing from the spirit of the invention, as defined and differentiated by the following claims.

What is claimed is:

1. A fluid pump, comprising:

at least one electrically-powered solid-state pump driver having a displacement element;

a variable-volume fluid chamber, the volume of which is modulated by the position of said element;

a first power controller operatively arranged to selectively supply an alternating current to said pump driver;

a driven valve having an inlet port and an outlet port, said driven valve being operatively arranged to control the flow of fluid with respect to said chamber, said driven valve having a body provided with a plurality of ports and having a member movable relative to said body to modulate the opening of said ports so as to form at least one three-way valve;

a valve driver operatively arranged to move said member relative to said body; and a second power controller electrically coupled to said first power controller and operatively arranged to control the phase of said valve driver in synchronism with the phase of said pump driver;

whereby said driven valve will allow fluid to be discharged from said chamber to said outlet port when said chamber contracts and will permit fluid to be drawn into said chamber through said inlet port when said chamber expands.

2. A fluid pump as set forth in claim 1 wherein said pump driver includes a magnetostrictive material.

3. A fluid pump as set forth in claim 1 wherein said pump driver includes an electrostrictive material.

4. A fluid pump as set forth in claim 1 wherein said pump driver includes a piezoelectric material.

5. A fluid pump as set forth in claim 1 wherein said moving member is arranged to be rotated relative to said body.

6. A fluid pump as set forth in claim 1 wherein said valve driver is a motor having a rotatable output shaft.

7. A fluid pump as set forth in claim 1 wherein the current supplied by said power controllers is in the form of current pulses.

8. A fluid pump as set forth in claim 1 and further comprising a hydraulic actuator operatively arranged to selectively communicate with said driven valve.

9. A fluid pump as set forth in claim 8 and further comprising at least one accumulator operatively arranged between said driven valve and said hydraulic actuator.

10. A fluid pump as set forth in claim 8 and further comprising a flow-control valve operatively arranged between said driven valve and said hydraulic actuator for controlling the flow of fluid with respect to said actuator.

11. A fluid pump as set forth in claim 8 wherein the output of said driven valve is provided directly to said hydraulic actuator.

12. A fluid pump as set forth in claim 8 wherein said first controller is operatively arranged to supply current in phase with respect to the phase of said valve driver to move said hydraulic actuator in one direction and to supply current 180° out of phase with respect to the phase of said valve driver to move said hydraulic actuator in the opposite direction.

13. A fluid pump as set forth in claim 1 wherein said pump comprises two of said pump drivers, and wherein said pump drivers are operatively arranged such that the forces they produce are opposed to one another.

14. A fluid pump, comprising:

an electrically-powered solid-state pump driver having a displacement element;

a variable-volume fluid chamber, the volume of which is modulated by the position of said element;

a first controller operatively arranged to selectively supply an alternating current to said pump driver; and a plurality of passive double-vortex valves, each having an inlet port and an outlet port, said valves being arranged to control the flow of fluid with respect to said chamber such that said valves will allow fluid to be discharged from said chamber to said outlet port when said chamber contracts and will permit fluid to be drawn into said chamber through said inlet port when said chamber expands.

15. A fluid pump as set forth in claim 14 wherein said vortex valve has greater impedance to flow in one direction than in the other direction.

* * * * *